US011791932B2

(12) United States Patent
Parker et al.

(10) Patent No.: US 11,791,932 B2
(45) Date of Patent: Oct. 17, 2023

(54) SD-WAN COMMUNICATION NETWORK FORWARD ERROR CORRECTION SYSTEMS AND METHODS

(71) Applicant: Fortinet, Inc., Sunnyvale, CA (US)

(72) Inventors: Scott Parker, Burnaby (CA); Shangwei Duan, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 113 days.

(21) Appl. No.: 17/158,265

(22) Filed: Jan. 26, 2021

(65) Prior Publication Data

US 2022/0239408 A1   Jul. 28, 2022

(51) Int. Cl.
*H04L 1/00* (2006.01)
*H04L 43/0852* (2022.01)
*H04L 43/12* (2022.01)
*H04L 43/0829* (2022.01)

(52) U.S. Cl.
CPC ........ *H04L 1/0057* (2013.01); *H04L 43/0829* (2013.01); *H04L 43/0852* (2013.01); *H04L 43/12* (2013.01)

(58) Field of Classification Search
CPC ..... H04L 1/203; H04L 1/0045; H04L 1/0041; H04L 2009/80; H04W 4/80
See application file for complete search history.

(56) References Cited

U.S. PATENT DOCUMENTS

| | | | | |
|---|---|---|---|---|
| 2014/0068357 | A1* | 3/2014 | Georges | H04L 47/40 714/704 |
| 2016/0352642 | A1* | 12/2016 | Tung | H04L 47/263 |
| 2018/0367243 | A1* | 12/2018 | Hsieh | H04N 21/44227 |
| 2019/0306282 | A1* | 10/2019 | Masputra | G06F 9/5005 |

* cited by examiner

*Primary Examiner* — Jason E Mattis
*Assistant Examiner* — Bao G Nguyen

(57) ABSTRACT

Systems and methods are provided for error correction in network data transfers. In some cases, such systems and methods include selection of a ratio of error correction to user data based upon determined communication channel health.

20 Claims, 7 Drawing Sheets

SD-WAN COMMUNICATION NETWORK FORWARD ERROR CORRECTION SYSTEMS AND METHODS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

FIELD

Embodiments of the present disclosure generally relate to the field of network data transfers. In particular, some embodiments include selection of a ratio of error correction to user data based upon determined communication channel health.

BACKGROUND

Description of the Related Art

Existing network devices utilize forward error correction using a defined amount of overhead per user data transferred. This forward error correction allows a receiving network device to recover negatively impacted network traffic. While enhancing lost packet recovery capability, such an approach has a negative impact on both network bandwidth and network latency.

Hence, there exists a need in the art for improved systems and methods for data transfer in a network environment.

SUMMARY

Embodiments of the present disclosure generally relate to the field of network data transfers. In particular, some embodiments include selection of a ratio of error correction to user data based upon determined communication channel health.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
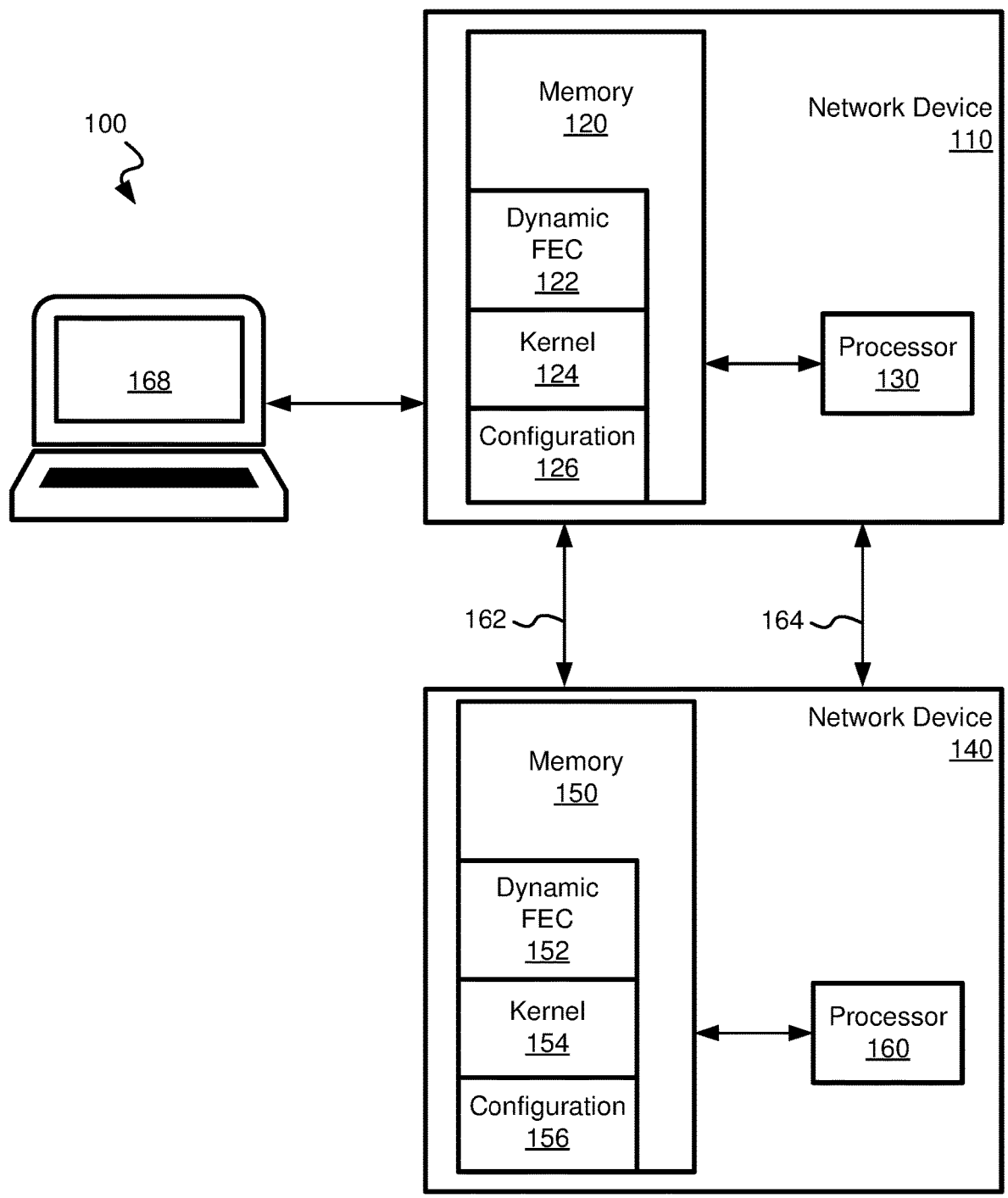
FIGS. 1A-B illustrate an example network including network devices capable of negotiating forward error correction parameters and applying forward error correction in accordance with the negotiated parameters in accordance with some embodiments.

Embodiments of the present disclosure generally relate to the field of network data transfers. In particular, some embodiments include selection of a ratio of error correction to user data based upon determined communication channel health.

Various embodiments provide methods for providing error correction in a network environment. The methods include: transferring, by a first network device, a first data set to a second network device via a communication interface; receiving a first indication of communication health corresponding to the first data set; transferring, by the first network device, a second data set to the second network device via the communication interface; and receiving a second indication of communication health corresponding to the second data set. The first data set includes first user data and first error correction data in a first ratio of the first error correction data to the first user data, and the second data set includes second user data and second error correction data in a second ratio of the second error correction data to the second user data. The method further includes: selecting, by the first network device, one of the first ratio or the second ratio as a transfer parameter based at least in part on the first indication of communication health and the second indication of communication health.

In some instances of the aforementioned embodiments, the methods further include: communicating, by the first network device, the transfer parameter to the second network device; calculating, by the first network device, a third error correction data based upon a third user data; assembling a third data set including the third user data and a set of the third error correction data in a proportion corresponding to the transfer parameter; and transferring, by the first network device, the third data set to the second network device.

In various instances of the aforementioned embodiments the communication interface includes a first interface and a second interface, the first indication of communication health includes a first packet loss and a first bandwidth, the second indication of communication health includes a second packet loss and a second bandwidth, the first data set further includes a first health probe, and the second data set further includes a second health probe. In some such instances, transferring the first data set from the first network device to the second network device via the communication interface includes: transferring the first health probe from the first network device to the second network device via the first interface and transferring a combination of the first user data and the first error correction data in the first ratio via the second interface; receiving the first indication of communication health corresponding to the first data set includes: receiving the first packet loss via the first interface and receiving the first bandwidth via the second interface; transferring the second data set from the first network device to the second network device via the communication interface includes: transferring the second health probe from the first network device to the second network device via the second interface and transferring a combination of the second user data and the second error correction data in the second ratio via the second interface; receiving the second indication of communication health corresponding to the second data set includes: receiving the second packet loss via the first interface and receiving the second bandwidth via the second interface; and selecting, by the first network device, one of the first ratio or the second ratio as the transfer parameter is based at least in part on a combination of the first packet loss, the second packet loss, the first bandwidth, and the second bandwidth. In various such instances, the first interface is a phase 2 Internet Protocol Security (IPSec) interface. In some such instances, the first network device is a network security device.

In some instances of the aforementioned embodiments, the methods further include: calculating, by the first network device, the first error correction data based upon the first user data; and calculating, by the first network device, the second error correction data based upon the second user data. In some such instances, calculating the first error correction data and the second error correction data is done based upon a Reed-Solomon encoding algorithm.

In yet other instances of the aforementioned embodiments, the communication interface includes a first interface and a second interface, the first indication of communication health includes a first packet loss, a first latency, and a first bandwidth, the second indication of communication health includes a second packet loss, a second latency, and a second bandwidth, the first data set further includes a first health probe, and the second data set further includes a second health probe. In some such instances, transferring the first data set from the first network device to the second network device via the communication interface includes: transferring the first health probe from the first network device to the second network device via the first interface and transferring a combination of the first user data and the first error correction data in the first ratio via the second interface; receiving the first indication of communication health corresponding to the first data set includes: receiving the first packet loss and the first latency via the first interface and receiving the first bandwidth via the second interface; transferring the second data set from the first network device to the second network device via the communication interface includes: transferring the second health probe from the first network device to the second network device via the first interface and transferring a combination of the second user data and the second error correction data in the second ratio via the second interface; receiving the second indication of communication health corresponding to the second data set includes: receiving the second packet loss and the second latency via the first interface and receiving the second bandwidth via the second interface; and selecting, by the first network device, one of the first ratio or the second ratio as the transfer parameter is based at least in part on a combination of the first packet loss, the second packet loss, the first latency, the second latency, the first bandwidth, and the second bandwidth.

Other embodiments provide network devices that include a processor and a computer readable medium. The computer readable medium includes non-transient instructions executable by the processor to: transfer a first data set to a recipient device via a communication interface, where the first data set includes first user data and first error correction data in a first ratio of the first error correction data to the first user data; receive a first indication of communication health corresponding to the first data set; transfer a second data set to the recipient device via the communication interface, where the second data set includes second user data and second error correction data in a second ratio of the second error correction data to the second user data; receive a second indication of communication health corresponding to the second data set; and select one of the first ratio or the second ratio as a transfer parameter based at least in part on the first indication of communication health and the second indication of communication health. In various cases, the network device is a network security device.

In some instances of the aforementioned embodiments, the non-transient instructions executable by the processor are further executable to: communicate the transfer parameter to the recipient device; calculate a third error correction data based upon a third user data; assemble a third data set including the third user data and a set of the third error correction data in a proportion corresponding to the transfer parameter; and transfer the third data set to the second network device.

In various instances of the aforementioned embodiments, the communication interface includes a first interface and a second interface, the first indication of communication health includes a first packet loss and a first bandwidth, the second indication of communication health includes a second packet loss and a second bandwidth, the first data set further includes a first health probe, and the second data set further includes a second health probe. In some such instances, the non-transient instructions executable by the processor to transfer the first data set from the network device to the recipient device via the communication interface include: non-transient instructions executable by the processor to transfer the first health probe from the network device to the recipient device via the first interface and transfer a combination of the first user data and the first error correction data in the first ratio via the second interface; the non-transient instructions executable by the processor to receive the first indication of communication health corresponding to the first data set include: non-transient instructions executable by the processor to receive the first packet loss via the first interface and receive the first bandwidth via the second interface; the non-transient instructions executable by the processor to transfer the second data set from the network device to the recipient device via the communication interface include: non-transient instructions executable by the processor to transfer the second health probe from the network device to the recipient device via the first interface and transfer a combination of the second user data and the second error correction data in the second ratio via the second interface; the non-transient instructions executable by the processor to receive the second indication of communication health corresponding to the second data set include: non-transient instructions executable by the processor to receive the second packet loss via the first interface and receive the second bandwidth via the second interface; and the non-transient instructions executable by the processor to select one of the first ratio or the second ratio as the transfer parameter include: non-transient instructions executable by the processor to select one of the first ratio or the second ratio as the transfer parameter based at least in part on a combination of the first packet loss, the second packet loss, the first bandwidth, and the second bandwidth. In some cases, the first interface is a phase 2 Internet Protocol Security (IPSec) interface.

In some instances of the aforementioned embodiments, the non-transient instructions are further executable by the processor to: calculate the first error correction data based upon the first user data; and calculate the second error correction data based upon the second user data. In some cases, the first error correction data and the second error correction data are calculated using a Reed-Solomon encoding algorithm.

Yet other embodiments provide non-transitory computer-readable storage media embodying a set of instructions, which when executed by one or more processing resources of a computer system, causes the one or more processing resources to perform a method including: transferring a first data set from a first network device to a second network device via a communication interface, where the first data set includes first user data and first error correction data in a first ratio of the first error correction data to the first user data; receiving a first indication of communication health corresponding to the first data set; transferring a second data set from the first network device to the second network device, where the second data set includes second user data and second error correction data in a second ratio of the second error correction data to the second user data; receiving a second indication of communication health corresponding to the second data set; and selecting one of the first ratio or the second ratio as a transfer parameter based at least in part on the first indication of communication health and the second indication of communication health.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. Such a network device may, for example, be a network security device that may reside within the particular network that it is protecting or network security may be provided as a service with the network security device residing in the cloud. Some network security devices may be implemented as general-purpose computers or servers with appropriate software operable to perform the one or more security functions. Other network security devices may also include custom hardware (e.g., one or more custom Application-Specific Integrated Circuits (ASICs)). For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

Some embodiments discussed herein can be implemented as software instructions executable by a hardware processor. In some embodiments, such software instructions form part of an operating system providing software control in a networking environment. One example of such an operating system is FORTIOS family of operating systems offering control of various network functions including security fabric. Of note, while the embodiments discussed herein are generally described as being implemented as software instructions executable by a hardware processor, it will be noted that such is not limiting and that other embodiments implemented with hardware accelerators are possible in accordance with other embodiments.

Turning to FIG. 1A, a network 100 is shown that includes a first network device 110 coupled to a second network device 140. First network device 110 is accessible by a network terminal 168. Network device 110 includes a processor 130 and a memory 120. Memory 120 includes instructions executable by processor 130 to perform a variety of functions including dynamic forward error correction 122, operating system kernel functions 124, and configuration 126. Similarly, network device 140 includes a processor 160 and a memory 150. Memory 150 includes instructions executable by processor 160 to perform a variety of functions including dynamic forward error correction 152, operating system kernel functions 154, and configuration 156. Network device 110 is coupled to network device 140 via one or more communication tunnels 162, 164. Terminal 168 may be any computing device known in the art that allows for configuration control of one or more of network device 110 and/or network device 140.

In operation, terminal 168 issues a configuration command to network device 110 causing the configuration function 126 to execute. The configuration command can indicate a change of selection between dynamic forward error correction and static forward error correction causing a change in a forward error correction selection parameter included in memory 120. In addition, one or more other configuration parameters included in the configuration command are updated including, but not limited to, a send timeout. The static/dynamic forward error correction selection indicates whether static forward error correction or dynamic error correction is to be used when transferring data to/from the first network device. When static forward error correction is selected by programming the static/dynamic forward error correction selection, the values programmed in a static user data quantity and static forward error correction quantity are used for calculating and assembling transmission packets including both user data and forward error correction data. Based upon the disclosure provided herein, one of ordinary skill in the art will recognize a variety of configuration parameters that may be maintained by the first network device and/or modifiable using a terminal device. This configuration information is forwarded to network device 140 to assure both network device 110 and network device 140 are using the same forward error correction processes.

Network device 110 determines whether dynamic or static forward error correction is selected by reading the forward error correction selection parameter in memory 120. Where static forward error correction is selected, the network device 110 performs forward error correction using the values in static user data quantity and the static forward error correction quantity. This results in the generation and inclusion of error correction data in a quantity indicated by the static forward error correction quantity. The quantity of user data is fixed to the static user data quantity resulting in a defined ratio of forward error correction data to user data.

Figure 1B:
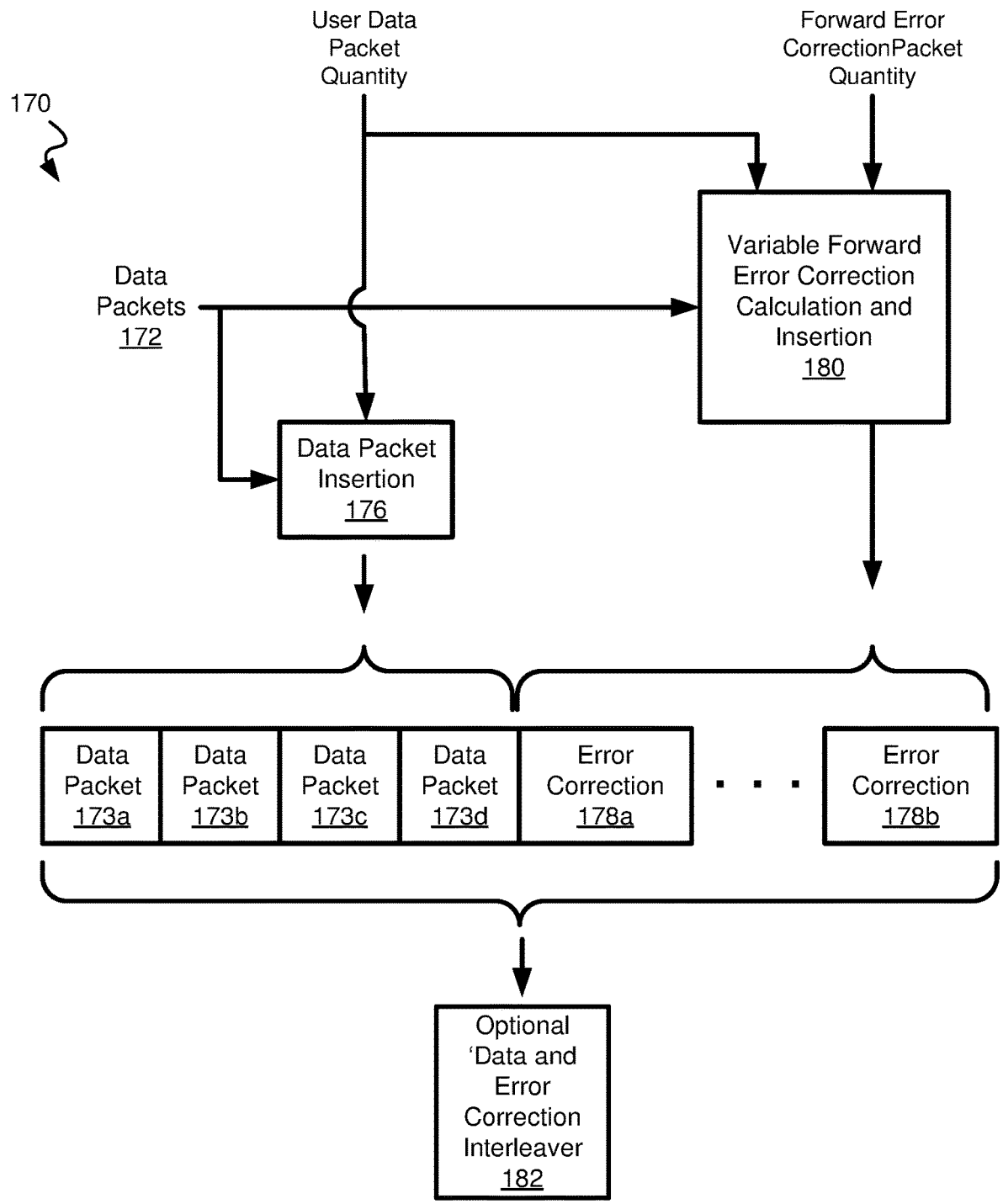

Turning to FIG. 1B, a block diagram 170 shows an example process for forming transfer data including both user data and forward error correction data. As shown, user data 172 is received. An amount of the user data corresponding to a selected user data packet quantity is assembled by a data packet insertion module 176 as data packets 173 of a transfer package 190. As an example where user data packet quantity is four (4), four data packets 173*a*, 173*b*, 173*c*, 173*d* are inserted by data packet insertion module 176 into transfer package 190. Based upon the disclosure provided herein, one of ordinary skill in the art will recognize a range of values for the user data packet quantity that may be used in relation to different embodiments.

The same user data designated for user data packets 173 is provided to a variable error correction calculation and insertion module 180 that calculates forward error correction data using the received user data, and inserts a quantity of error correction data 178 (e.g., error correction packets 178*a*, 178*b*) corresponding to the forward error correction quantity into transfer package 190. The value of the forward error correction quantity can range from zero (0) where no forward error correction is to be used to a value much greater than the user data packet quantity where a high ratio of error correction data to user data is desired. Any approach for generating error correction data corresponding to user data and inserting the error correction data in a transfer package may be used in relation to different embodiments. For example, in some embodiments, the error correction data is generated by applying a Reed Solomon encoding algorithm to the user data where the static user data quantity is used to generate the static forward error correction quantity of Reed Solomon encoded error correction data. Based upon the disclosure provided herein, one of ordinary skill in the art will recognize a variety of encoding algorithms and/or error correction generation processes that may be used in relation to different embodiments. In embodiments, an optional interleaver module 182 is used to interleave the user data and error correction data yielding an interleaved transfer package. The sending device and receiving device use the same parameters (e.g., user data packet quantity, forward error correction packet quantity, interleaver algorithm) to allow the recipient device to decode the encoding applied by the sending device.

Returning to FIG. 1A, where reading the forward error correction selection parameter in memory 120 indicates dynamic forward error correction is selected, network device opens communication tunnel 162 and communication tunnel 164. Network device 110 sends a number of transfer packages 190 across communication tunnel 162 and a number of health probes across communication tunnel 164 using different combinations of (a) user data packet quantity and (b) forward error correction packet quantity while collecting packet loss, latency, and bandwidth information corresponding to the different combinations of (a) user data packet quantity and (b) forward error correction packet quantity. The collection of packet loss, latency, and bandwidth information is then used by network device 110 to select a combination of (a) user data packet quantity and (b) forward error correction packet quantity that matches the characteristics of the communication path between network device 110 and network device 140. This selected combination is then used for future communications between network device 110 and network device 140.

Further information about the process of selecting a combination (a) user data packet quantity and (b) forward error correction packet quantity is discussed below in relation to FIGS. 2A-2C. Also, example processes for encoding and decoding user data in accordance with some embodiments are discussed below in relation to FIGS. 3-4.

Figure 2A:
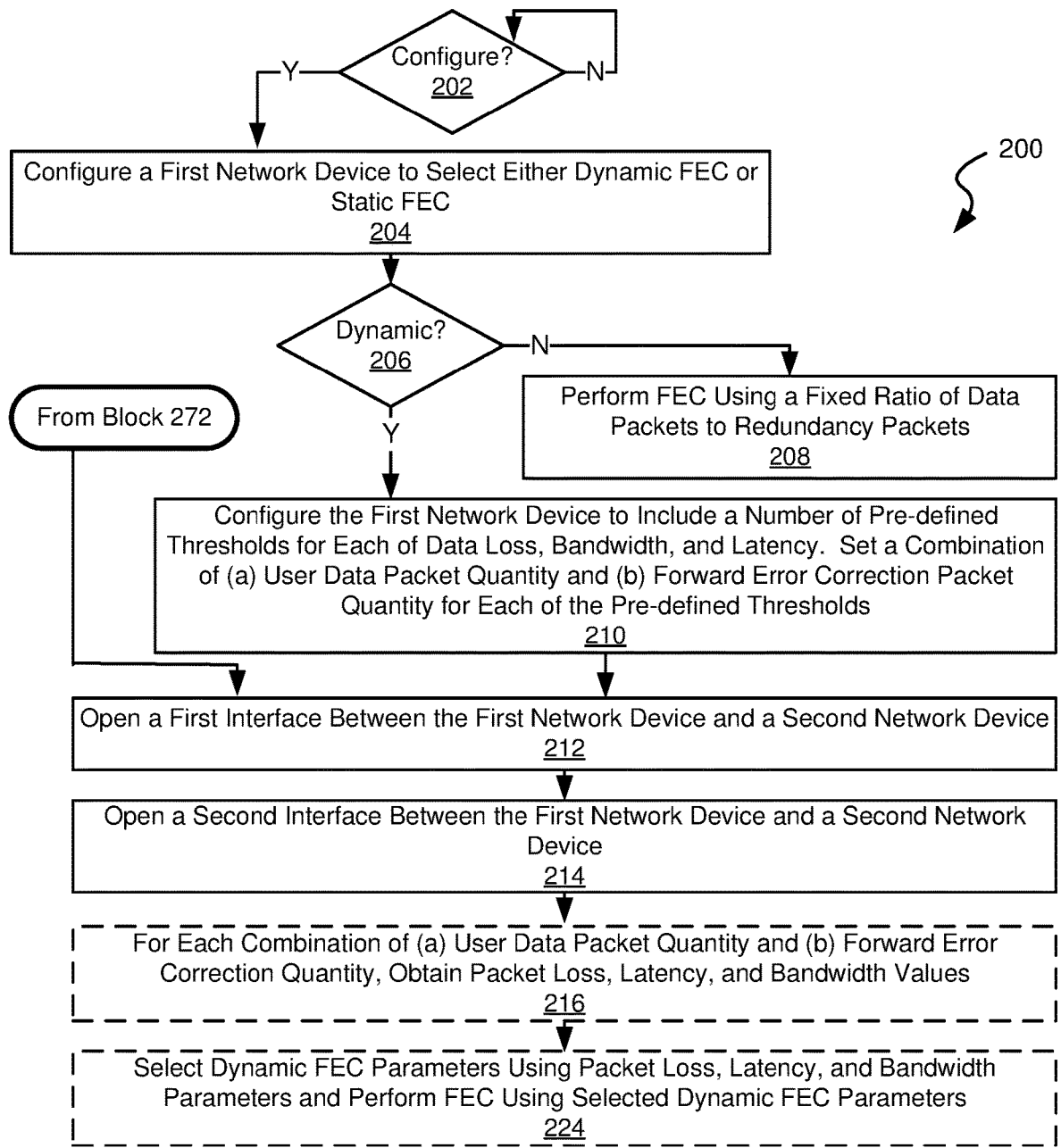
FIGS. 2A-2C are flow diagrams showing a method in accordance with some embodiments for negotiating and performing forward error correction.
Figure 2B:
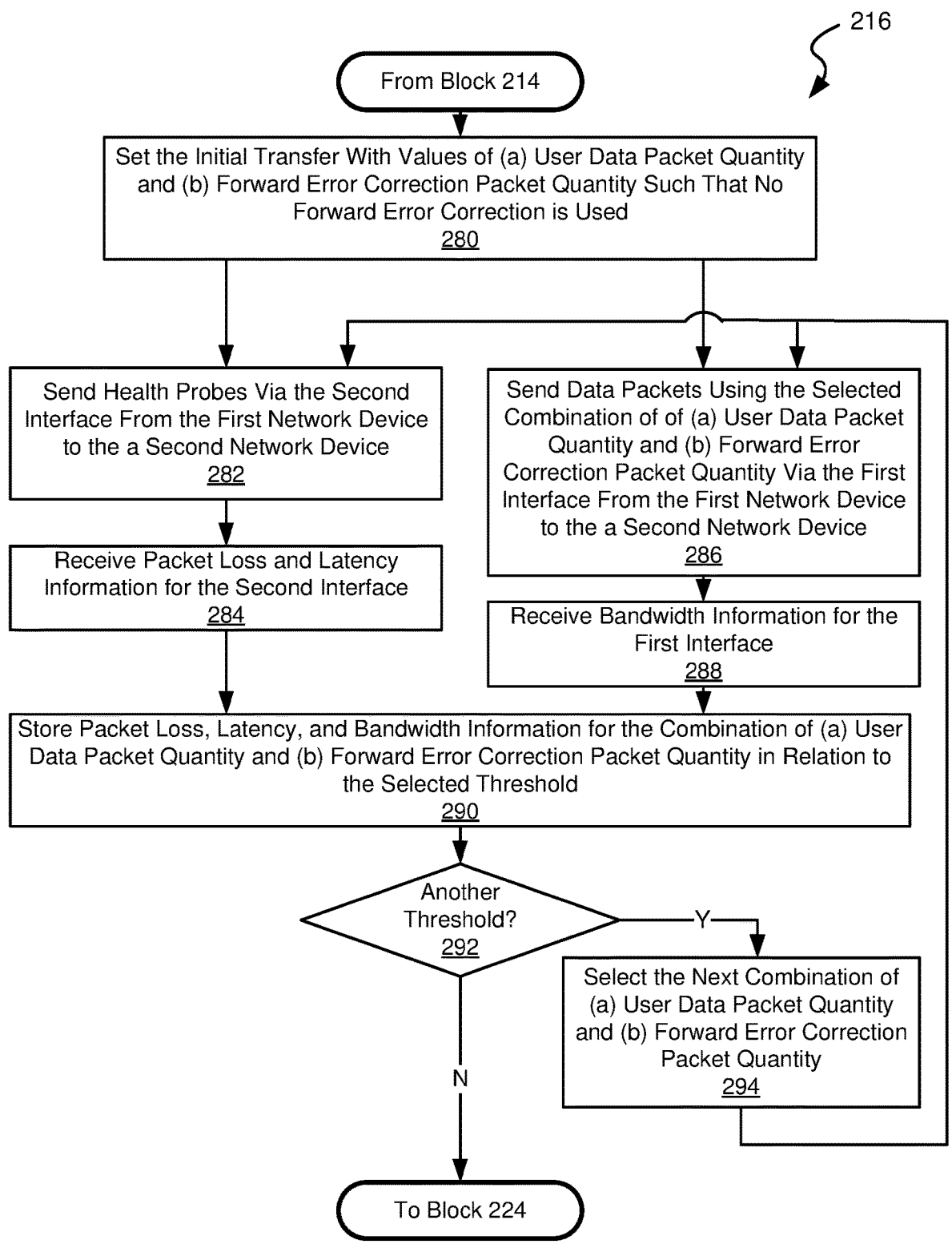
Figure 2C:
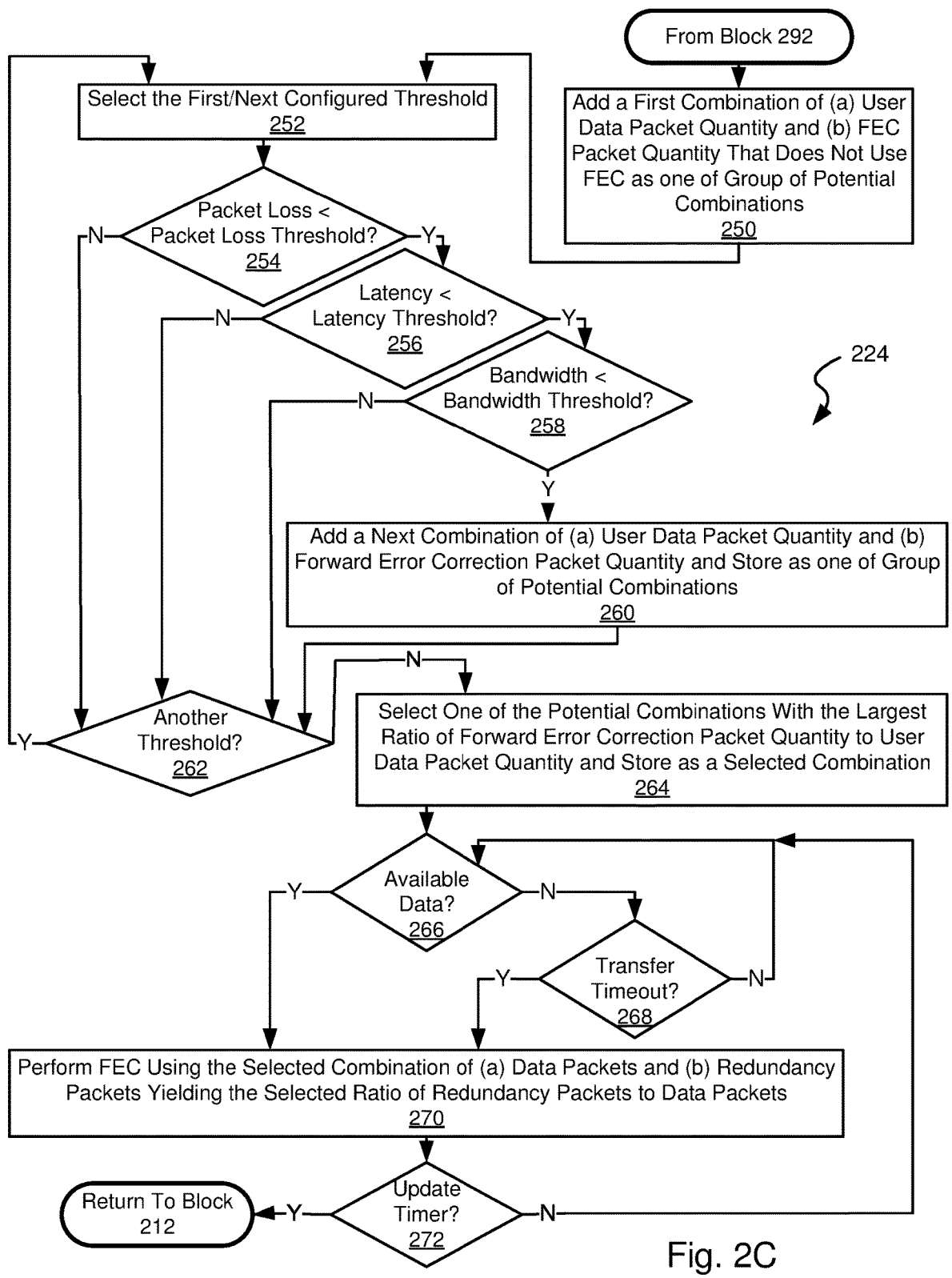

Turning to FIG. 2A, a flow diagram 200 shows a method in accordance with some embodiments for negotiating and performing forward error correction. Following flow diagram 200, it is determined whether a configuration command has been received by a first network device (block 202). A configuration command may be received from, for example, a terminal device that is communicably coupled to the first network device, or from a second network device. Such a configuration command when executed causes one or more configuration parameters to be updated.

Upon receiving a configuration command (block 202), dynamic forward error correction or static forward error correction is selected by programming a forward error correction selection parameter (block 204). In addition, one or more other configuration parameters included in the configuration command may be updated including, but not limited to, a send timeout. The static/dynamic forward error correction selection indicates whether static forward error correction or dynamic forward error correction is to be used when transferring data to/from the first network device. When static forward error correction is selected by programming the static/dynamic forward error correction selection, the values programmed in a static user data quantity and a static forward error correction quantity are used for calculating and assembling transmission packages including both user data and forward error correction data. Based upon the disclosure provided herein, one of ordinary skill in the art will recognize a variety of configuration parameters that may be maintained by the first network device and/or modifiable using, for example, a terminal device.

It is determined whether dynamic or static forward error correction is selected (block 206). As intimated above, this determination is made by reading the static/dynamic forward error correction selection. Where static forward error correction is selected (block 206), the first network device performs forward error correction using the values in static user data quantity and the static forward error correction quantity (block 208). This results in the generation and inclusion of error correction data in a quantity indicated by the static forward error correction quantity. The quantity of user data is fixed to the static user data quantity resulting in a defined ratio of forward error correction data to user data. Any approach for generating error correction data corresponding to user data, and incorporating that error correction data may be used in relation to the various embodiments. For example, in some embodiments, the error correction data is generated by applying a Reed Solomon encoding algorithm to the user data where the static user data quantity is used to generate the static forward error correction quantity of Reed Solomon encoded error correction data. Based upon the disclosure provided herein, one of ordinary skill in the art will recognize a variety of encoding algorithms and/or error correction generation processes that may be used in relation to different embodiments.

Alternatively, where dynamic forward error correction is selected (block 206), the first network device is configured to include additional parameters specific to the dynamic forward error correction (block 210). This includes setting a number of packet loss thresholds and setting a respective set of dynamic user data packet quantity and dynamic forward error correction packet quantity for each of the packet loss thresholds; setting a number of latency thresholds and setting a respective set of dynamic user data packet quantity and dynamic forward error correction packet quantity for each of the latency thresholds; and setting a number of bandwidth thresholds and setting a respective set of dynamic user data packet quantity and dynamic forward error correction packet quantity for each of the bandwidth thresholds. Again, based upon the disclosure provided herein, one of ordinary skill in the art will recognize a variety of configuration parameters that may be maintained by the first network device and/or modifiable using a terminal device.

With the configuration values updated, a first interface or tunnel is opened between the first network device and the second network device (block 212). In some embodiments, this first interface is a first phase 2 IPSEC interface as is known in the art. Based upon the disclosure provided herein, one of ordinary skill in the art will recognize a variety of interface types and/or protocols that may be used in relation to different embodiments. In addition, a second interface or tunnel is opened between the first network device and the second network device (block 214). In some embodiments, this second interface is a second phase 2 IPSEC interface as is known in the art. Based upon the disclosure provided herein, one of ordinary skill in the art will recognize a variety of interface types and/or protocols that may be used in relation to different embodiments.

For each of the packet loss, latency, and bandwidth thresholds set-up during the configuration, the combination of (a) dynamic user data packet quantity and (b) dynamic forward error correction packet quantity are used to obtain respective packet loss, latency, and bandwidth values for each of the thresholds (block 216). Of note, block 216 is shown in dashed lines as it is represented by a flow diagram of the same number 216 that is shown in more detail in FIG. 2B. Turning to FIG. 2B and following flow diagram 216, an initial transfer using values for (a) dynamic user data packet quantity and (b) dynamic forward error correction packet quantity are used such that no forward error correction is applied when user data is transferred (block 280). These values are provided from the first network device to the second network device to assure the second network device can properly decode transfers it is receiving. As an example, each transfer may include: four (4) user data packets as indicated by the dynamic user data packet quantity and zero (0) forward error correction packets as indicated by the dynamic forward error correction packet quantity. Based upon the disclosure provided herein, one of ordinary skill in the art will recognize other combinations including zero (0) forward error correction packets with different numbers of user data packets.

Transfers are formatted in accordance with the selected combination of (a) dynamic user data packet quantity and (b) dynamic forward error correction packet quantity, and the transfer data is sent via the first interface from the first network device to the second network device (block 286). Bandwidth information is received by the first network device indicating a level of bandwidth achieved during the transfer of the data (block 288). At the same time, health probes are sent from the first network device to the second network device via the second interface (block 282), and packet loss and latency information is received in response to the health probes (block 284). In some embodiments, the packet loss is expressed as a percentage of packets lost and the latency and bandwidth are expressed as values corresponding to an average latency and an average bandwidth experienced during the transfer. All three of the packet loss information, latency information, and bandwidth information represent a quality of communication between the first network device and the second network device for the selected combination of (a) dynamic user data packet quantity and (b) dynamic forward error correction packet quantity. Based upon the disclosure provided herein, one of ordinary skill in the art will recognize a variety of health probes, data transfers and/or other commands useful in establishing packet loss, latency, and bandwidth information corresponding to a transfer between two network devices.

The packet loss, latency, and bandwidth information is stored for each combination of (a) dynamic user data packet quantity and (b) dynamic forward error correction packet quantity associated with a given threshold (block 290). It is determined whether another one of the packet loss, latency, or bandwidth thresholds remain to be tested (block 292). Where another threshold remains to be tested (block 292), the next threshold to be tested is selected, and the processes of block 282-292 are repeated using the combination of (a) dynamic user data packet quantity and (b) dynamic forward error correction packet quantity corresponding to the next selected threshold (block 294). Again, the newly selected values for (a) dynamic user data packet quantity and (b) dynamic forward error correction packet quantity are provided from the first network device to the second network device to assure the second network device can properly decode transfers it is receiving.

Once packet loss, latency and bandwidth information is generated and stored for each of the thresholds set-up during configuration (blocks 282-292), the generated information is used in selecting a combination of (a) dynamic user data packet quantity and (b) dynamic forward error correction packet quantity that will be used to perform subsequent transfers between the first network device and the second network device (block 224). Of note, block 224 is shown in dashed lines (FIG. 2A) as it is represented by a flow diagram of the same number 224 shown in FIG. 2C. Turning to FIG. 2C and following flow diagram 224, a first combination of (a) dynamic user data packet quantity and (b) dynamic forward error correction packet quantity is added to a previously empty group of potential combinations (block 250). This first combination indicates a non-zero number of user data packets (e.g., four (4)) that will be combined with no (0) forward error correction packets. Thus, the first combination would result in data transfers without any forward error correction.

Next, the first/next packet loss threshold, latency threshold, or bandwidth threshold is selected (block 252). The processes of blocks 250-262 continues until all of the respective packet loss, latency, and bandwidth thresholds have been selected and tested. The packet loss information for the selected threshold is compared with an acceptable packet loss threshold (block 254). Where the packet loss information generated for the selected threshold is less than the acceptable packet loss threshold (block 254), the latency information generated for the same selected threshold is compared with an acceptable latency threshold (block 256). Where the latency information generated for the same selected threshold is less than the acceptable latency threshold (block 256), the bandwidth information generated for the same selected threshold is compared with an acceptable bandwidth threshold (block 258). Where the bandwidth information generated for the same selected threshold is less than the acceptable bandwidth threshold (block 258), the tested combination of (a) dynamic user data packet quantity and (b) dynamic forward error correction packet quantity is added to the group of potential combinations (block 260). Alternatively, where any of the packet loss information, latency information, or bandwidth information for the selected threshold is unacceptable (blocks 254, 256, 258), the tested combination is not included in the group of potential combinations.

It is determined whether another one of the packet loss, latency, or bandwidth thresholds remain to be tested (block 262). Where another threshold remains to be tested (block 262), the processes of blocks 252-262 are repeated for the next threshold. Alternatively, where no other thresholds remain to be tested (block 262) one of the combinations of (a) dynamic user data packet quantity and (b) dynamic forward error correction packet quantity in the group of potential combinations is selected for use in governing transfers between the first network device and the second network device (block 264). In some embodiments, the selected combination is that which exhibits the highest ratio of dynamic forward error correction packet quantity to dynamic user data quantity. With this selection complete (block 264), the selected combination of (a) dynamic user data packet quantity and (b) dynamic forward error correction packet quantity is provided from the first network device to the second network device so that the second network device can properly decoding transfers from the first network device.

It is determined if sufficient user data has been received for transfer to the second network device (block 266). If either sufficient user data has been received (block 266) or a time period greater than the send timeout parameter configured in block 204 has expired since the last transfer (block 268), forward error correction data is calculated for the available user data using the selected combination of (a) dynamic user data packet quantity and (b) dynamic forward error correction packet quantity (block 270) and the user data augmented with the calculated forward error correction is transferred to the second network device.

It is determined whether a timer indicating an update of the selected combination of (a) dynamic user data packet quantity and (b) dynamic forward error correction packet quantity has expired (block 272). Where the update timer has not expired (block 272), the process or preparing and transferring data continues with the previously selected combination of (a) dynamic user data packet quantity and (b) dynamic forward error correction packet quantity (blocks 266-272). Alternatively, where the update timer has expired (block 272), processing returns to block 212 where the selection of the combination of (a) dynamic user data packet quantity and (b) dynamic forward error correction packet quantity is updated.

Figure 3:
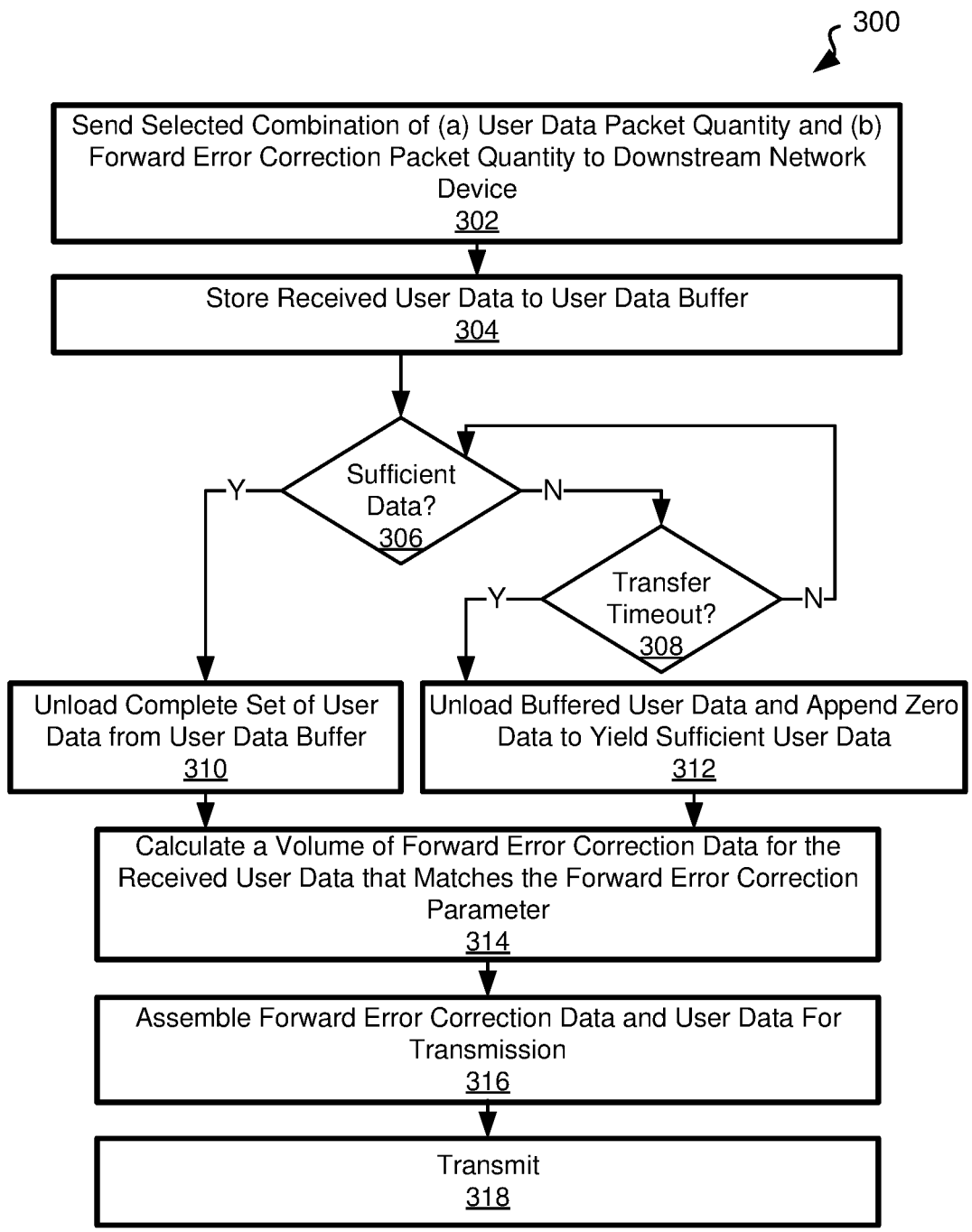
FIG. 3 is a flow diagram showing performing forward error correction based upon negotiated forward error correction parameters in accordance with some embodiments.

Turning to FIG. 3, a flow diagram 300 shows performing forward error correction based upon negotiated forward error correction parameters in accordance with some embodiments. Following flow diagram 300, a combination of (a) user data packet quantity and (b) forward error correction packet quantity selected by a first network device using a process such as that discussed above in relation to FIGS. 2A-2C is sent to a second network device (block 302). This assures that both network devices are using the same encoding and decoding parameters. User data is stored to a user data buffer as it is received (block 304).

It is determined if sufficient user data has been received for transfer to the second network device (block 306). If sufficient user data has been received (block 306), the sufficient amount of user data (i.e., an amount of user data corresponding to user data packet quantity) is unloaded from the user data buffer (block 310). Alternatively, where insufficient user data has been received (block 306), but a time period greater than a send timeout parameter has expired since the last transfer (block 308), all available user data is unloaded from the user data buffer and padded with zeros to yield sufficient user data (block 312).

A volume of forward error correction data indicated by the forward error correction packet quantity is calculated using the user data from either block 310 of block 312). This volume of forward error correction data is assembled with the user data from either block 310 or block 312 into a transfer package for transmission to the second network device (block 316). This transfer package is then sent to the second network device (block 318).

Figure 4:
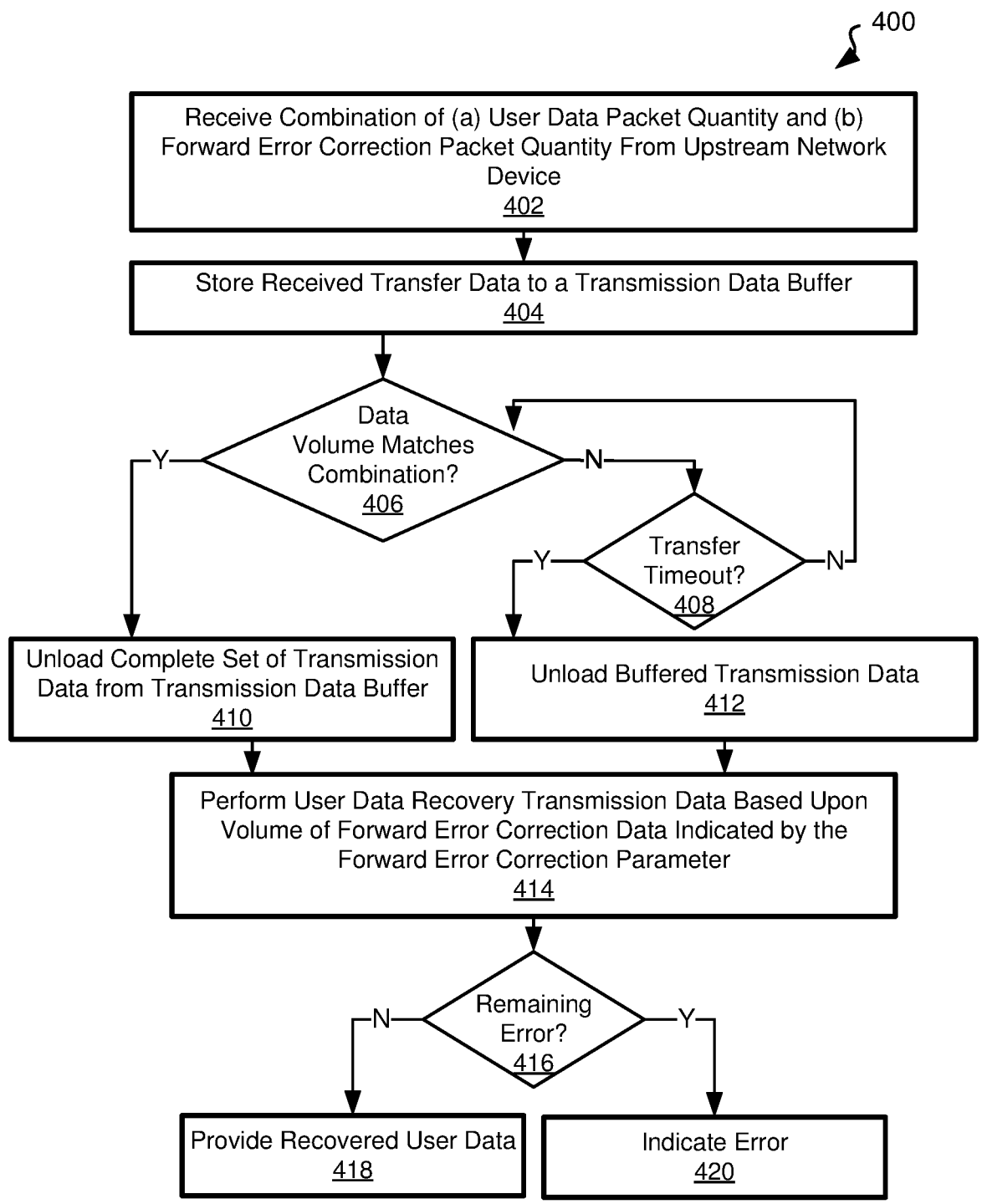
FIG. 4 is a flow diagram showing data recovery from transmission including forward error correction based upon negotiated forward error correction parameters in accordance with some embodiments.

Turning to FIG. 4, a flow diagram 400 shows data recovery from a received transfer package including forward error correction using a combination of (a) user data packet quantity and (b) forward error correction packet quantity. Following flow diagram 400, a second network device receives a selected combination of (a) user data packet quantity and (b) forward error correction packet quantity from a first network device (block 402). This assures that both network devices are using the same encoding and decoding parameters. A received transfer package including user data and forward error correction data is received and stored to a transmission data buffer (block 404).

It is determined whether the volume of data matches the quantity indicated by the combination of (a) user data packet quantity and (b) forward error correction packet quantity (block 406). Where the received volume matches (block 406), a complete transfer package including the expected volume of user data and forward error correction data is unloaded from the transmission data buffer (block 410). Alternatively, where insufficient data has been received (block 306), but a time period greater than a transfer timeout parameter has expired since the last transfer (block 408), all available data in the transmission buffer is unloaded (block 412).

User data recovery is applied to the transmission data based upon the combination of (a) user data packet quantity and (b) forward error correction packet quantity (block 414). This recovery process uses the forward error correction data to correct any errors or lost data in the user data and operates essentially as the reverse of the process of calculating the forward error correction data performed by the first network device. It is determined whether any errors remain in the user data after use of the forward error correction data (block 416). Where errors remain that cannot be corrected (block 416), an error is indicated (block 420). Otherwise, where no errors remain (block 406), the recovered user data is provided (block 418).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for providing error correction in a network environment; the method comprising:
   transferring, by a first network device, a first data set to a second network device, wherein the first data set includes:
      first user data and first error correction data in a first ratio of the first error correction data to the first user data transferred via a second interface, and
      a first health probe transferred via a first interface;
   receiving a first indication of communication health corresponding to the first data set, wherein the first indication of communication health includes a first packet loss and a first bandwidth, wherein the first packet loss is received via the first interface, and wherein the first bandwidth is received via the second interface;
   transferring, by the first network device, a second data set to the second network device, wherein the second data set includes:
      second user data and second error correction data in a second ratio of the second error correction data to the second user data transferred via the second interface, and
      a second health probe transferred via the first interface;
   receiving a second indication of communication health corresponding to the second data set, wherein the second indication of communication health includes a second packet loss and a second bandwidth, wherein the second packet loss is received via the first interface, and wherein the second bandwidth is received via the second interface;
   selecting, by the first network device, one of the first ratio or the second ratio as a transfer parameter based at least in part on the first indication of communication health and the second indication of communication health.

2. The method of claim 1, wherein the second interface is a phase 2 Internet Protocol Security (IPSec) interface.

3. The method of claim 1, wherein the first network device is a network security device.

4. The method of claim 1, wherein the method further comprises:
   calculating, by the first network device, the first error correction data based upon the first user data; and
   calculating, by the first network device, the second error correction data based upon the second user data.

5. The method of claim 4, wherein calculating the first error correction data and the second error correction data is done based upon a Reed-Solomon encoding algorithm.

6. The method of claim 1, wherein the first indication of communication health further includes a first latency, wherein the second indication of communication health further includes a second latency, and wherein:
   receiving the first indication of communication health corresponding to the first data set further includes:
      receiving the first latency via the first interface;
   receiving the second indication of communication health corresponding to the second data set further includes:
      receiving the second latency via the first interface; and
   selecting, by the first network device, one of the first ratio or the second ratio as the transfer parameter is based at least in part on a combination of the first packet loss, the second packet loss, the first latency, the second latency, the first bandwidth, and the second bandwidth.

7. The method of claim 1, the method further comprising:
   communicating, by the first network device, the transfer parameter to the second network device;
   calculating, by the first network device, a third error correction data based upon a third user data;
   assembling a third data set including the third user data and a set of the third error correction data in a proportion corresponding to the transfer parameter; and
   transferring, by the first network device, the third data set to the second network device.

8. A network device, the network device comprising:
   a processor;
   a non-transient computer-readable medium, the non-transient computer-readable medium including instructions executable by the processor to:
      transfer a first data set to a recipient device, wherein the first data set includes:
         first user data and first error correction data in a first ratio of the first error correction data to the first user data;

a first health probe transferred via a first interface;
receive a first indication of communication health corresponding to the first data set, wherein the first indication of communication health includes a first packet loss and a first bandwidth, wherein the first packet loss is received via the first interface, and wherein the first bandwidth is received via the second interface;
transfer a second data set to the recipient device via the communication interface, wherein the second data set includes:
second user data and second error correction data in a second ratio of the second error correction data to the second user data transferred via the second interface, and
a second health probe transferred via the first interface;
receive a second indication of communication health corresponding to the second data set, wherein the second indication of communication health includes a second packet loss and a second bandwidth, wherein the second packet loss is received via the first interface, and wherein the second bandwidth is received via the second interface; and
select one of the first ratio or the second ratio as a transfer parameter based at least in part on the first indication of communication health and the second indication of communication health.

9. The network device of claim 8, wherein the non-transient computer-readable medium further includes instructions executable by the processor to: communicate the transfer parameter to the recipient device; calculate a third error correction data based upon a third user data; assemble a third data set including the third user data and a set of the third error correction data in a proportion corresponding to the transfer parameter; and transfer the third data set to the second network device.

10. The network device of claim 8, wherein network device is a network security device.

11. The network device of claim 10, wherein the second interface is a phase 2 Internet Protocol Security (IPSec) interface.

12. The network device of claim 8, wherein the non-transient computer-readable medium further includes instructions executable by the processor to: calculate the first error correction data based upon the first user data; and calculate the second error correction data based upon the second user data.

13. The network device of claim 12, wherein the first error correction data and the second error correction data are calculated using a Reed-Solomon encoding algorithm.

14. The network device of claim 8, wherein the communication interface includes a first interface and a second interface, wherein—the first indication of communication health further includes a first latency, wherein the second indication of communication health further includes a second latency, and wherein the non-transient computer-readable medium further includes instructions executable by the processor to:
receive the first latency via the first interface;
receive the second latency via the first interface; and
select one of the first ratio or the second ratio as the transfer parameter based at least in part on a combination of the first packet loss, the second packet loss, the first bandwidth, and the second bandwidth.

15. A non-transitory computer-readable storage medium embodying a set of instructions, which when executed by one or more processing resources of a computer system, causes the one or more processing resources to perform a method comprising:
transfer a first data set to a recipient device, wherein the first data set includes:
first user data and first error correction data in a first ratio of the first error correction data to the first user data transferred via a second interface, and
a first health probe transferred via a first interface;
receive a first indication of communication health corresponding to the first data set, wherein the first indication of communication health includes a first packet loss and a first bandwidth, wherein the first packet loss is received via the first interface, and wherein the first bandwidth is received via the second interface;
transfer a second data set to the recipient device via the communication interface, wherein the second data set includes:
second user data and second error correction data in a second ratio of the second error correction data to the second user data transferred via the second interface, and
a second health probe transferred via the first interface;
receive a second indication of communication health corresponding to the second data set, wherein the second indication of communication health includes a second packet loss and a second bandwidth, wherein the second packet loss is received via the first interface, and wherein the second bandwidth is received via the second interface; and
select one of the first ratio or the second ratio as a transfer parameter based at least in part on the first indication of communication health and the second indication of communication health.

16. The non-transitory computer-readable storage medium of claim 15, wherein the set of instructions, which when executed by one or more processing resources of the computer system, causes the one or more processing resources to perform the method further comprising:
communicating the transfer parameter from the first network device to the second network device;
calculating a third error correction data based upon a third user data;
assembling a third data set including the third user data and a set of the third error correction data in a proportion corresponding to the transfer parameter; and
transferring the third data set from the first network device to the second network device.

17. The non-transitory computer-readable storage medium of claim 15, wherein the second interface is a phase 2 Internet Protocol Security (IPSec) interface.

18. The non-transitory computer-readable storage medium of claim 15, wherein the non-transient computer-readable medium further includes instructions executable by the processor to: calculate the first error correction data based upon the first user data; and calculate the second error correction data based upon the second user data.

19. The non-transitory computer-readable storage medium of claim 15,
wherein the non-transient computer-readable medium further includes instructions executable by the processor to: communicate the transfer parameter to the recipient device; calculate a third error correction data based upon a third user data; assemble a third data set including the third user data and a set of the third error correction data in a proportion corresponding to the transfer parameter; and transfer the third data set to the second network device.

20. The non-transitory computer-readable storage medium of claim 15,
wherein the first indication of communication health further includes a first latency,
wherein the second indication of communication health further includes a second latency,
and wherein the non-transient computer-readable medium further includes instructions executable by the processor to:
receive the first latency via the first interface;
receive the second latency via the first interface; and
select one of the first ratio or the second ratio as the transfer parameter based at least in part on a combination of the first packet loss, the second packet loss, the first bandwidth, and the second bandwidth.

\* \* \* \* \*